United States Patent
Yamazaki et al.

(10) Patent No.: US 9,755,562 B2
(45) Date of Patent: Sep. 5, 2017

(54) POWER CONVERTOR, CONTROLLER, AND METHOD FOR CHANGING CARRIER FREQUENCY

(71) Applicant: KABUSHIKI KAISHA YASKAWA DENKI, Kitakyushu-shi (JP)

(72) Inventors: Akira Yamazaki, Kitakyushu (JP); Yoichi Yano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/757,846

(22) Filed: Dec. 24, 2015

(65) Prior Publication Data
US 2016/0190970 A1 Jun. 30, 2016

(30) Foreign Application Priority Data
Dec. 24, 2014 (JP) .................. 2014-259736

(51) Int. Cl.
*H02P 27/04* (2016.01)
*H02P 27/08* (2006.01)
*H02P 21/06* (2016.01)
*H02P 21/00* (2016.01)
*H02P 27/16* (2006.01)

(52) U.S. Cl.
CPC .......... *H02P 27/08* (2013.01); *H02P 21/0021* (2013.01); *H02P 21/06* (2013.01); *H02P 27/085* (2013.01); *H02P 27/16* (2013.01); *H02P 2205/01* (2013.01); *H02P 2209/13* (2013.01)

(58) Field of Classification Search
CPC .......... H02P 21/00; H02P 27/04; H02P 23/00; H02P 25/00; H02P 27/00; H02P 27/06; H02P 6/00

USPC .... 318/400.01, 400.02, 400.14, 400.15, 700, 318/701, 721, 727, 779, 805, 807, 599, 318/811, 812, 430, 432, 437, 801; 388/800, 819, 823; 363/21.1, 40, 44, 95, 363/120, 174, 175
See application file for complete search history.

(56) References Cited

U.S. PATENT DOCUMENTS

2010/0250067 A1* 9/2010 Matsumura ............ B62D 5/046
701/41

FOREIGN PATENT DOCUMENTS

| GB | 2452790 | 3/2009 |
|---|---|---|
| JP | 2001-037248 | 2/2001 |

OTHER PUBLICATIONS

Extended European Search Report for corresponding EP Application No. 15200018.8-1809, May 27, 2016.

* cited by examiner

Primary Examiner — Antony M Paul
(74) Attorney, Agent, or Firm — Mori & Ward, LLP

(57) ABSTRACT

A power convertor includes a power conversion unit, a PWM controller, and a frequency changer. The power conversion unit includes a plurality of switching elements. The PWM controller is configured to perform PWM control of the plurality of switching elements. The frequency changer is configured to change a carrier frequency in the PWM control. The frequency changer includes an outputter, an integrator, and a frequency determiner. The outputter is configured to output a control value in accordance with a control deviation with respect to a control target. The integrator is configured to integrate the control value output from the outputter. The frequency determiner is configured to determine the carrier frequency based on an integral value obtained by the integrator.

17 Claims, 8 Drawing Sheets

POWER CONVERTOR, CONTROLLER, AND METHOD FOR CHANGING CARRIER FREQUENCY

CROSS-REFERENCE TO RELATED APPLICATIONS

The present application claims priority under 35 U.S.C. §119 to Japanese Patent Application No. 2014-259736, filed Dec. 24, 2014. The contents of this application are incorporated herein by reference in their entirety.

BACKGROUND

Field of the Invention

The embodiments disclosed herein relate to a power convertor, a controller, and a method for changing a carrier frequency.

Discussion of the Background

Examples of PWM-control power convertors include inverters, convertors, and matrix convertors.

Japanese Unexamined Patent Application Publication No. 2001-37248 discloses an inverter that involves changing carrier cycle in PWM control in accordance with a control deviation, in an attempt to enhance control responsiveness. Specifically, the inverter generates a cyclic modulation coefficient that is inversely proportionate to the absolute value of a current control deviation, which is a current deviation between a current command and a current detection value. The inverter uses the cyclic modulation coefficient to change carrier frequency and gain of current control.

SUMMARY

According to one aspect of the present disclosure, a power convertor includes a power conversion unit, a PWM controller, and a frequency changer. The power conversion unit includes a plurality of switching elements. The PWM controller is configured to perform PWM control of the plurality of switching elements. The frequency changer is configured to change a carrier frequency in the PWM control. The frequency changer includes an outputter, an integrator, and a frequency determiner. The outputter is configured to output a control value in accordance with a control deviation with respect to a control target. The integrator is configured to integrate the control value output from the outputter. The frequency determiner is configured to determine the carrier frequency based on an integral value obtained by the integrator.

According to another aspect of the present disclosure, a controller to change a carrier frequency in PWM control includes an outputter, an integrator, and a frequency determiner. The outputter is configured to output a control value in accordance with a control deviation with respect to a control target. The integrator is configured to integrate the control value output from the outputter. The frequency determiner is configured to determine the carrier frequency based on an integral value obtained by the integrator.

According to the other aspect of the present disclosure, a method for changing a carrier frequency in PWM control includes generating a control value in accordance with a control deviation with respect to a control target. The generated control value is integrated. The carrier frequency is determined based on an integral value obtained in the integrating step.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A power convertor, a controller, and a method for changing a carrier frequency according to embodiments will be described in detail below with reference to the accompanying drawings. The following embodiments are provided for exemplary purposes only and are not intended to limit the present disclosure.

Figure 1A:
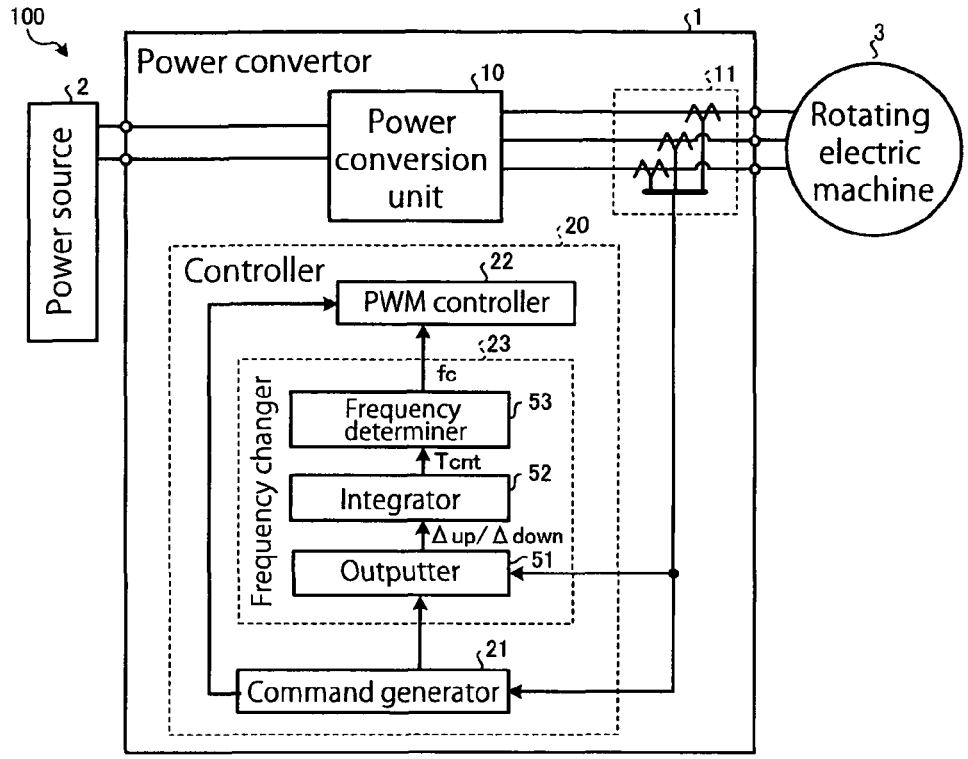
FIG. 1A is a diagram illustrating a power conversion system including a power convertor according to an embodiment.

FIG. 1A is a diagram illustrating a power conversion system including a power convertor according to an embodiment. As illustrated in FIG. 1A, the power conversion system 100 according to this embodiment includes a power convertor 1, a power source 2, and a rotating electric machine 3. The power convertor 1 is interposed between the power source 2 and the rotating electric machine 3 to perform power conversion between the power source 2 and the rotating electric machine 3. The power convertor 1 functions as, for example, a motor controller to control the current through the rotating electric machine 3 so as to control the rotating electric machine 3.

Examples of the power source 2 include, but are not limited to, direct-current (DC) power sources and alternating-current (AC) power sources such as fuel cells and power generators to convert natural energy of solar power or wind power into electric energy. Examples of the rotating electric machine 3 include motors with a stator and a rotor. Another possible example of the power source 2 is a power system. Another possible example of the rotating electric machine 3 is a power generator with a stator and a rotor.

The power convertor 1 includes a power conversion unit 10, a current detector 11, and a controller 20 (which is an example of the controller). The power conversion unit 10 includes components such as a plurality of switching elements, and the controller 20 controls switching of the switching elements. The current detector 11 detects current flowing between the power conversion unit 10 and the rotating electric machine 3 (hereinafter referred to as output current). In the following description, voltage output from the power conversion unit 10 to the rotating electric machine 3 will be referred to as output voltage.

The controller 20 controls the switching elements of the power conversion unit 10 to perform power conversion between the power source 2 and the rotating electric machine 3. The controller 20 includes a command generator 21, a PWM controller 22, and a frequency changer 23.

The command generator 21 generates a control command to a control target. Examples of the control target include, but are not limited to, the rotation position of the rotating electric machine 3, the rotation speed of the rotating electric machine 3, the output current, and the output voltage. For example, the command generator 21 generates an output voltage command serving as the control command based on, for example, the output current detected by the current detector 11.

Based on the control command generated by the command generator 21, the PWM controller 22 generates a drive signal (hereinafter referred to as PWM signal) for pulse width modulation (PWM) control of the switching elements of the power conversion unit 10. For example, the PWM controller 22 compares the output voltage command with a carrier signal to generate the PWM signal.

Based on a control deviation $\Delta cont$ with respect to the control target, the frequency changer 23 changes carrier frequency fc, which is used in PWM control performed by the PWM controller 22. A non-limiting example of the carrier frequency fc is the frequency of the carrier signal. For example, the frequency changer 23 calculates a deviation (hereinafter referred to as current deviation) between the output current command generated by the command generator 21 and the output current detected by the current detector 11. Based on the current deviation, the frequency changer 23 changes the carrier frequency fc.

The frequency changer 23 includes an outputter 51, an integrator 52, and a frequency determiner 53. The outputter 51 outputs a control value in accordance with the control deviation $\Delta cont$. For example, in a cycle of Ts, which is shorter than carrier cycle Tc (=1/fc), the outputter 51 compares the control deviation $\Delta cont$ with a threshold TH1 (which is an example of the first threshold) and with a threshold TH2 (which is an example of the second threshold).

For example, when the control deviation $\Delta cont$ is equal to or larger than the threshold TH1, the outputter 51 outputs a carrier-up value $\Delta up$ (which is an example of the first control value) to increase the carrier frequency fc. When the control deviation $\Delta cont$ is equal to or smaller than the threshold TH2, the outputter 51 outputs a carrier-down value $\Delta down$ (which is an example of the second control value) to decrease the carrier frequency fc.

The integrator 52 integrates the output from the outputter 51 and outputs an integral value Tcnt. Based on the integral value Tcnt, which is obtained by the integrator 52, the frequency determiner 53 determines the carrier frequency fc. The PWM controller 22 performs PWM control at the carrier frequency fc determined by the frequency determiner 53.

Figure 1B:
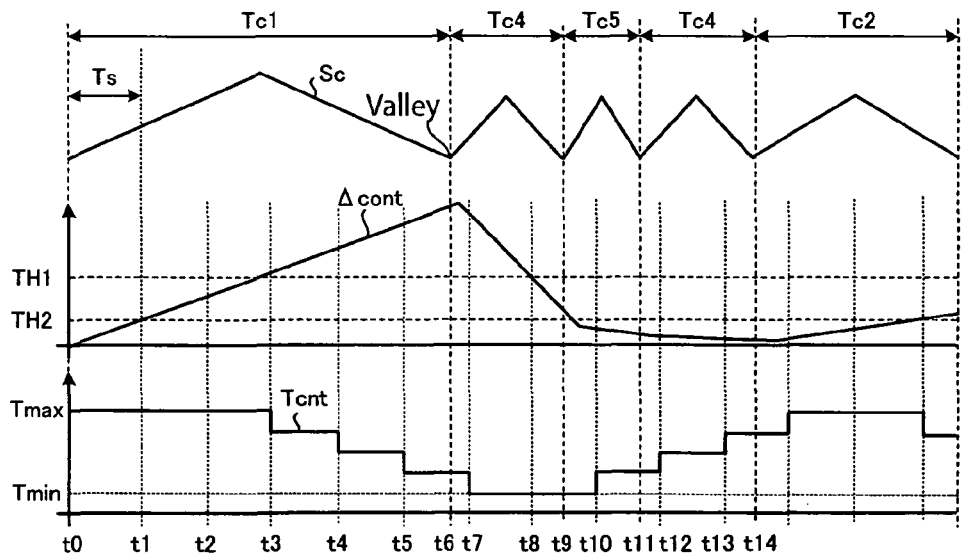
FIG. 1B is a graph of a control deviation, an integral value, and a carrier frequency in relation to each other.

FIG. 1B is a graph of the control deviation $\Delta cont$, the integral value Tcnt, and the carrier frequency fc in relation to each other. Assume that at timing t0, Tcnt=Tmax and fc=1/Tc1. Assume that from timing t0, the control deviation $\Delta cont$ gradually increases, and that the carrier-up value $\Delta up$ is a negative value, and the carrier-down value $\Delta down$ is a positive value. Assume that the integral value Tcnt is restricted within the range between an upper limit value Tmax and a lower limit value Tmin.

In the cycle Ts, which is shorter than the carrier cycle Tc, the outputter 51 compares the control deviation $\Delta cont$ with the threshold TH1 and with the threshold TH2. In the embodiment illustrated in FIG. 1B, the control deviation $\Delta cont$ gradually increases from timing t0 and becomes equal to or larger than the threshold TH1 between timings t3 and t5 in a carrier cycle Tc1. In view of this, between timings t3 and t5, the outputter 51 repeatedly outputs the carrier-up value $\Delta up$ to cause the integral value Tcnt, which is obtained by the integrator 52, to gradually decrease.

The frequency determiner 53 determines the carrier frequency fc in the cycle Ts, for example. Up to timing t5, the carrier-up value $\Delta up$ has been output three times consecutively, and thus the frequency determiner 53 determines a frequency fc4 (=1/Tc4), which is three levels higher than the frequency fc, as the carrier frequency fc. At a timing (namely, timing t6) corresponding to a valley of the carrier signal, the PWM controller 22 changes the carrier signal Sc into a carrier signal of the frequency fc4 to perform PWM control.

After the carrier signal Sc has been changed into the carrier signal of the frequency fc4 at timing t6, the control deviation $\Delta cont$ gradually decreases. Since the control deviation $\Delta cont$ is equal to or larger than the threshold TH2 from timing t7 to timing t9, the integral value Tcnt becomes the lower limit value Tmin. In view of this, the frequency determiner 53 determines a frequency fc5 (=1/Tc5), which is one level higher than the frequency fc4, as the carrier frequency fc. At a timing (namely, timing t9) corresponding to a valley of the carrier signal, the PWM controller 22 changes the carrier signal Sc into a carrier signal of the frequency fc5 to perform PWM control.

Even after the carrier signal Sc has been changed into the carrier signal of the frequency fc5 at timing t9, the control deviation $\Delta cont$ continuously decreases until timing t10. Around timing t10, the control deviation $\Delta cont$ becomes equal to or smaller than the threshold TH2. In view of this, the outputter 51 outputs the carrier-down value $\Delta down$ to increase the integral value Tcnt. The frequency determiner 53 determines the frequency fc4 (1/Tc4), which is one level lower than the frequency fc5, as the carrier frequency fc. At a timing (namely, timing t11) corresponding to a valley of the carrier signal, the PWM controller 22 changes the carrier signal Sc into a carrier signal of the frequency fc4 to perform PWM control.

From then on, the frequency determiner 53 similarly determines the carrier frequency fc based on the integral value Tcnt to set the carrier frequency fc so as to decrease the control deviation $\Delta cont$. Thus, as the control deviation increases, the carrier cycle Tc of the PWM control is shortened. This configuration enhances control responsiveness. Also in this configuration, the integral value Tcnt is used to determine the carrier frequency fc. This ensures that even if noise or other factors cause a detection error, the carrier frequency fc is adjusted more accurately.

Figure 2:
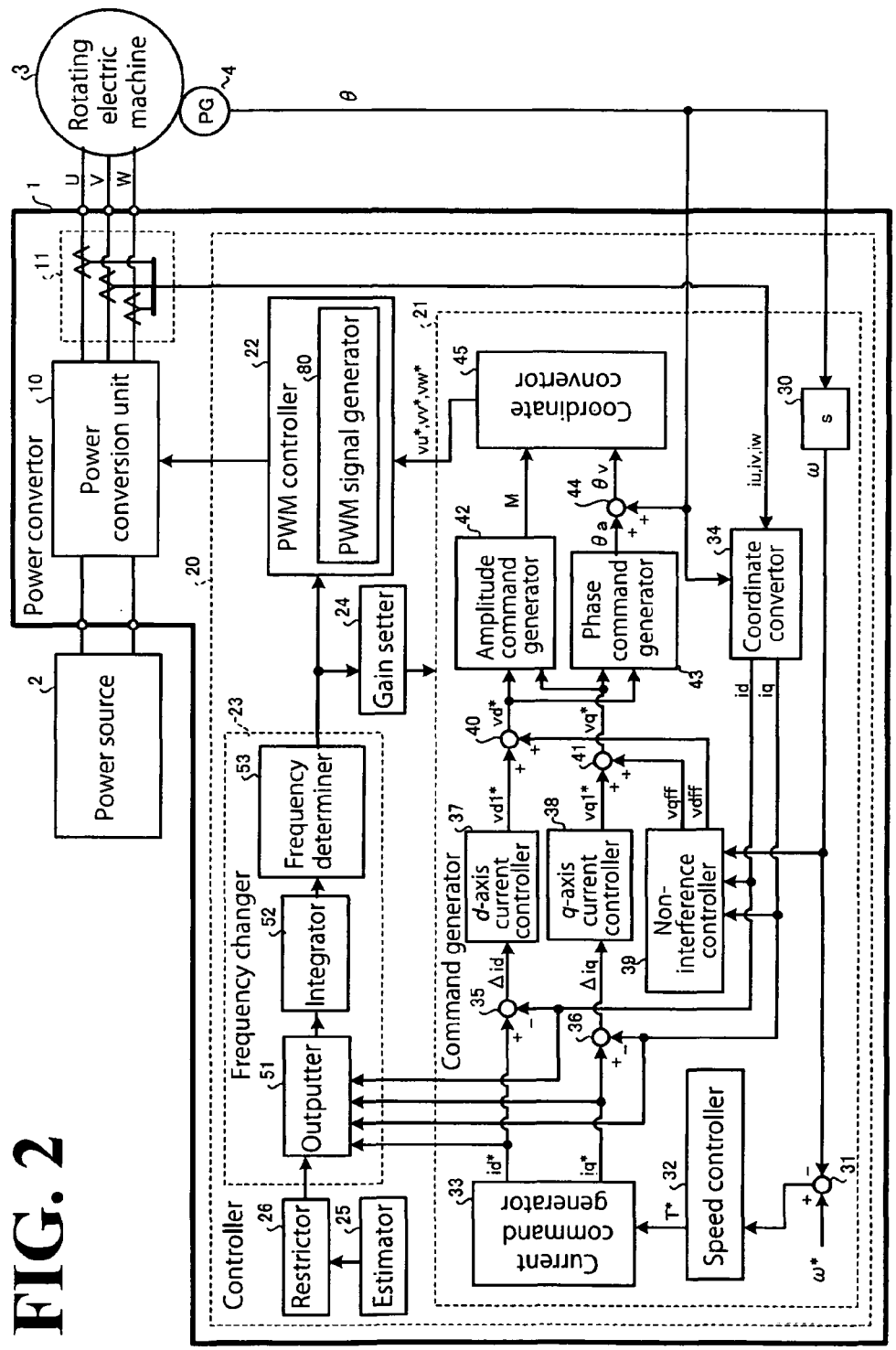
FIG. 2 is a diagram illustrating an exemplary configuration of the power convertor illustrated in FIG. 1A.

The power convertor 1 according to this embodiment will now be described in more detail. FIG. 2 is a diagram illustrating an exemplary configuration of the power convertor 1 illustrated in FIG. 1A. In the embodiment illustrated in FIG. 2, the control deviation $\Delta cont$ is a control deviation of the output current.

As illustrated in FIG. 2, the power convertor 1 includes the power conversion unit 10, the current detector 11, and the controller 20. The power conversion unit 10 includes the plurality of switching elements to perform power conversion between the power source 2 and the rotating electric machine 3. Examples of the power source 2 include, but are not limited to, DC power sources and AC power sources.

The power conversion unit 10 may be coupled to other devices and power source systems, instead of to the rotating electric machine 3.

Figure 3A:
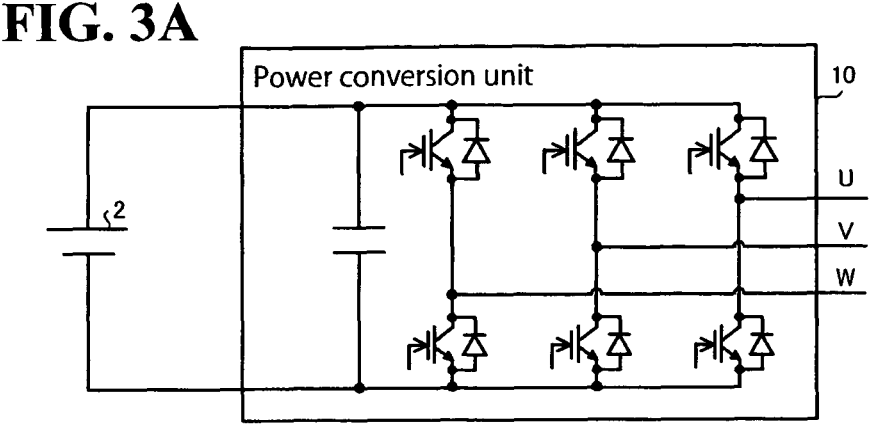
FIG. 3A is a diagram illustrating an exemplary configuration of a power conversion unit.
Figure 3B:
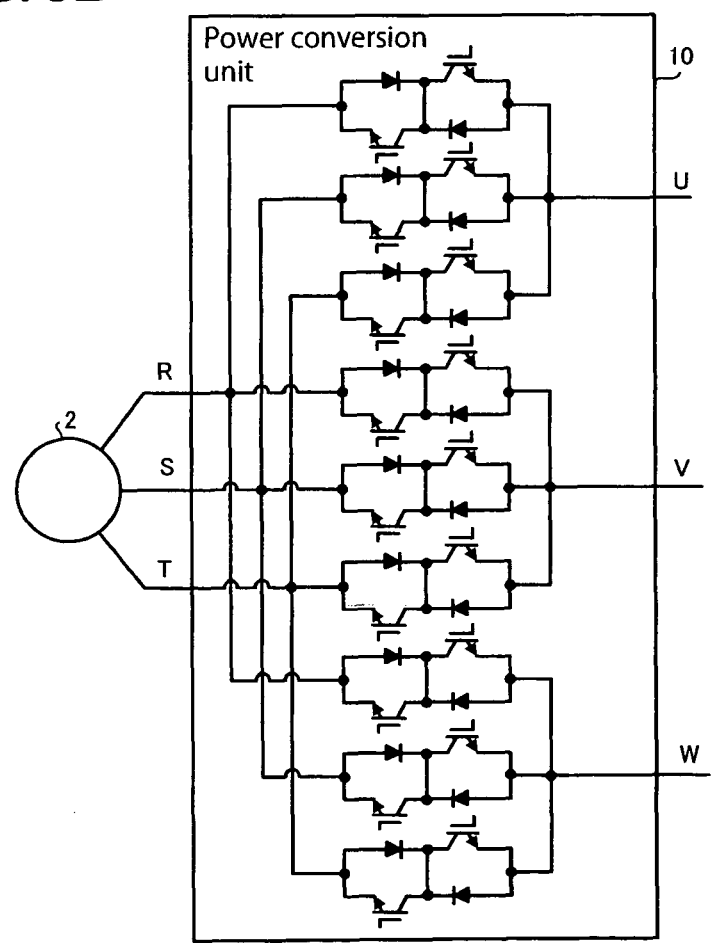
FIG. 3B is a diagram illustrating another exemplary configuration of a power conversion unit.

FIGS. 3A and 3B are diagrams illustrating exemplary configurations of the power conversion unit 10. The power conversion unit 10 illustrated in FIG. 3A is an inverter circuit including a three-phase bridge circuit. The power conversion unit 10 illustrated in FIG. 3B is a matrix convertor circuit including bidirectional switches that respectively connect the phases (the R phase, the S phase, and the T phase) of the power source 2 to the phases (the U phase, the V phase, and the W phase) of the rotating electric machine 3. It is noted that the power conversion unit 10 should not be limited to the configurations illustrated in FIGS. 3A and 3B insofar as the power conversion unit 10 is capable of power conversion between the power source 2 and the rotating electric machine 3. Another possible embodiment of the power conversion unit 10 is a convertor circuit.

Referring back to FIG. 2, the power convertor 1 will be further described. As illustrated in FIG. 2, the current detector 11 detects instantaneous values iu, iv, and iw of currents (hereinafter referred to as output currents iu, iv, and iw) that respectively flow between the power conversion unit 10 and the U phase, the V phase, and the W phase of the rotating electric machine 3. The current detector 11 detects current using Hall elements, which are magneto-electric conversion elements.

The controller 20 includes the command generator 21, the PWM controller 22, the frequency changer 23, a gain setter 24, an estimator 25, and a restrictor 26. The command generator 21 generates output voltage commands vu*, vv*, and vw* in a predetermined calculation cycle Ts (hereinafter referred to as command calculation cycle Ts). The PWM controller 22 generates a PWM signal in every carrier cycle Tc (=1/fc) by a carrier comparison method or a space vector method. Based on the PWM signal, the PWM controller 22 controls the switching elements of the power conversion unit 10. For example, the PWM controller 22 compares the output voltage commands vu*, vv*, and vw* with the carrier signal Sc to generate the PWM signal.

The command generator 21 includes a differentiator 30, subtractors 31, 35, and 36, a speed controller 32, a current command generator 33, coordinate convertors 34 and 45, a d-axis current controller 37, a q-axis current controller 38, a non-interference controller 39, adders 40, 41, and 44, an amplitude command generator 42, and a phase command generator 43.

The differentiator 30 differentiates the rotation position, θ (electrical angle), of the rotating electric machine 3 to obtain the rotation speed, ω (electrical angular speed), of the rotating electric machine 3. The rotation position θ of the rotating electric machine 3 is detected by a rotation position detector 4 (such as an encoder) or a similar device attached to the rotating electric machine 3. The subtractor 31 subtracts the rotation speed co from a speed command ω. The speed command ω* is generated by a speed command generator or a similar device, not illustrated. For example, the speed controller 32 generates a torque command T* to make the deviation (speed deviation) between the speed command ω* and the rotation speed ω zero.

The current command generator 33 generates a d-axis current command id* and a q-axis current command iq* based on the torque command T*. The d-axis current command id* is a d-axis component in a d-q axis coordinate system. The q-axis current command iq* is a q-axis component in the d-q axis coordinate system. The d-q axis coordinate system is an orthogonal coordinate system that rotates in synchronism with the output frequency of AC voltage output from the power conversion unit 10. The d-axis component is a component on the axis parallel to the magnetic flux of the rotating electric machine 3 in the d-q axis coordinate system, and the q-axis component is a component on the q-axis, which is perpendicular to the d-axis, in the d-q axis coordinate system.

The coordinate convertor 34 converts the output currents iu, iv, and iw into αβ components on two orthogonal axes of a fixed coordinate system to calculate a fixed coordinate current vector iαβ of the αβ axis coordinate system. The coordinate convertor 34 also uses the rotation position θ to convert the fixed coordinate current vector iαβ into d-q components of the d-q axis coordinate system. Thus, the coordinate convertor 34 calculates the d-axis current id, which is a current component in the d-axis direction, and the q-axis current iq, which is a current component in the q-axis direction.

The subtractor 35 subtracts the d-axis current id from the d-axis current command id*. The subtractor 36 subtracts the q-axis current iq from the q-axis current command iq*. The d-axis current controller 37 generates a d-axis voltage command vd1 to make the d-axis current deviation, Δid, between the d-axis current command id* and the d-axis current id zero. The q-axis current controller 38 generates a q-axis voltage command vq1* to make the q-axis current deviation Δiq between the q-axis current command iq* and the q-axis current iq zero.

The non-interference controller 39 compensates for interference between the d-axis and the q-axis and for induction voltage. Based on the d-axis current id, the q-axis current iq, the rotation speed w, and an induction voltage constant φ, the non-interference controller 39 generates and outputs a d-axis voltage compensation value vdff and a q-axis voltage compensation value vqff. For example, the non-interference controller 39 performs the calculation "−id×ωLd+ωφ" to obtain the q-axis voltage compensation value vqff, and performs the calculation "−iq×ωLq" to obtain the d-axis voltage compensation value vdff. In the above-described calculations, Ld denotes a d-axis inductance value of the rotating electric machine 3, and Lq denotes a q-axis inductance value of the rotating electric machine 3. In cases where a power system or other device than the rotating electric machine 3 is coupled to the power conversion unit 10, there is no need for providing the non-interference controller 39.

The adder 40 adds the d-axis voltage compensation value vdff to the d-axis voltage command vd1* so as to generate a d-axis voltage command vd*. The adder 41 adds the q-axis voltage compensation value vqff to the q-axis voltage command vq1* so as to generate a q-axis voltage command vq*.

The amplitude command generator 42 calculates an amplitude command M based on the d-axis voltage command vd* and the q-axis voltage command vq*. For example, the amplitude command generator 42 obtains the amplitude command M by the calculation represented by the following Formula (1). The phase command generator 43 calculates an output phase command θa based on the d-axis voltage command vd* and the q-axis voltage command vq. For example, the phase command generator 43 obtains the output phase command θa by the calculation represented by the following Formula (2). The adder 44 adds the rotation position θ to the output phase command θa output from the phase command generator 43 so as to obtain a phase θv, and outputs the phase θv to the coordinate convertor 45.

$$M=\sqrt{(vd^{*2}+vq^{*2})} \qquad (1)$$

$$\theta a=\tan^{-1}(vq^*/vd^*) \qquad (2)$$

The coordinate convertor 45 generates the output voltage commands vu*, vv*, and vw* based on the amplitude command M and the phase θv. For example, the coordinate convertor 45 may perform the calculations "vu*=M×sin(θv)", "vv*=M×sin(θv−2/3π)", and "vw*=M×sin(θv−4/3π)" to generate the output voltage commands vu*, vv*, and vw*.

The PWM controller 22 includes a PWM signal generator 80. The PWM signal generator 80 generates a PWM signal based on the output voltage commands vu*, vv*, and vw by the triangular wave comparison method or the space vector method. Then, the PWM signal generator 80 outputs the PWM signal to the power conversion unit 10. Thus, the switching elements constituting the power conversion unit 10 are controlled between ON and OFF, and three-phase AC power corresponding to the output voltage commands vu*, vv*, and vw* is output from the power conversion unit 10 to the rotating electric machine 3.

The frequency changer 23 repeatedly determines the carrier frequency fc for PWM control in every command calculation cycle Ts (=1/fs). For example, at a timing corresponding to a valley of the carrier signal Sc, the frequency changer 23 changes the carrier frequency fc of the PWM controller 22.

The gain setter 24 adjusts a gain for feedback control of the control target in accordance with the carrier frequency fc. The command generator 21 performs feedback control of the control target using the gain adjusted by the gain setter 24.

Figure 4:
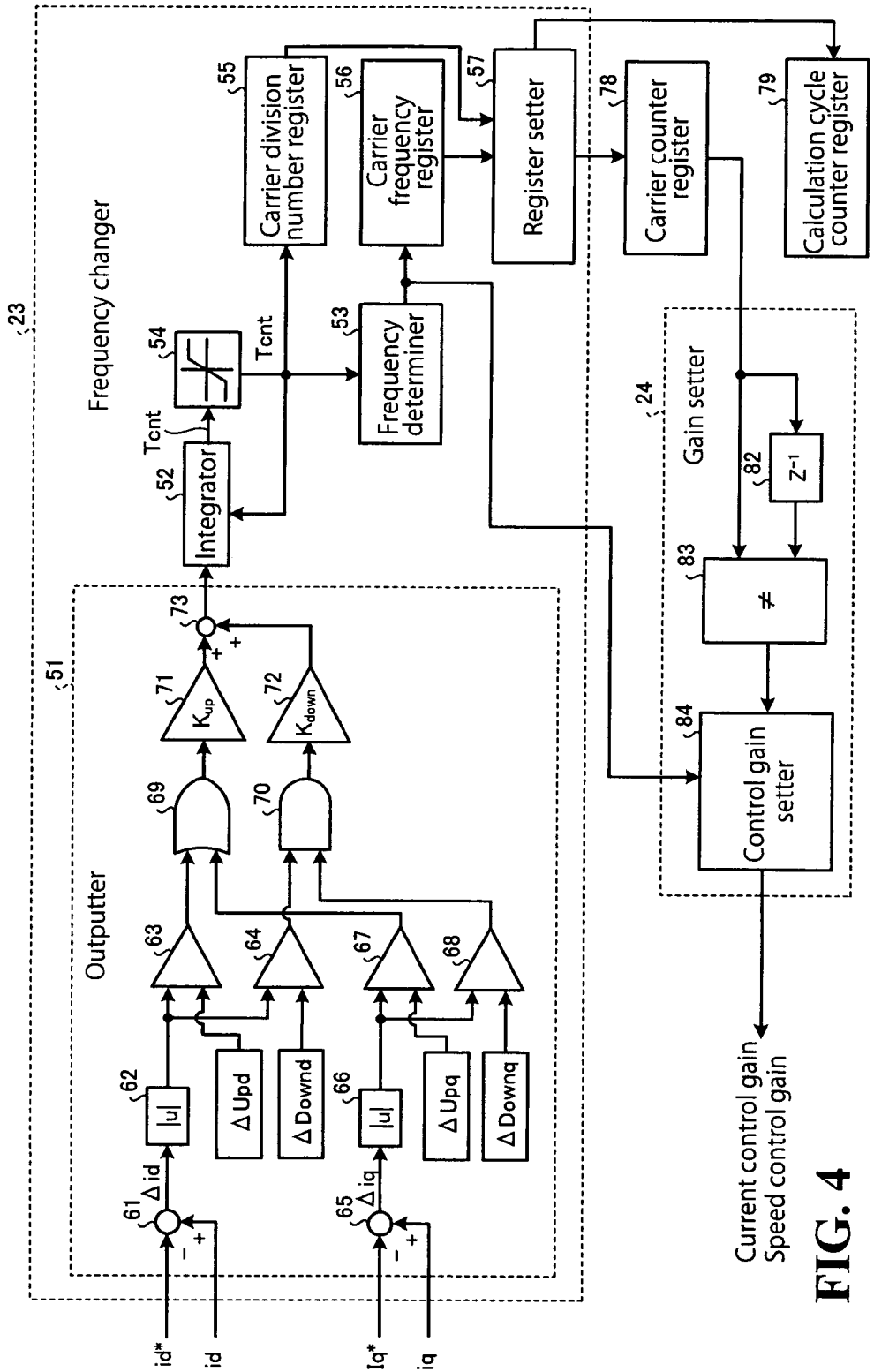
FIG. 4 is a diagram illustrating an exemplary configuration of a frequency changer and a gain setter illustrated in FIG. 2.

An exemplary configuration of the frequency changer 23 and the gain setter 24 will now be described. FIG. 4 is a diagram illustrating the exemplary configuration of the frequency changer 23 and the gain setter 24. As illustrated in FIG. 4, the outputter 51 includes subtractors 61 and 65 (which are examples of the difference calculator), absolute value calculators 62 and 66, comparers 63 and 67 (which are examples of the first comparer), comparers 64 and 68 (which are examples of the second comparer), a logical sum calculator 69, a logical product calculator 70, multipliers 71 and 72, and an adder 73.

The subtractor 61 subtracts the d-axis current id from the d-axis current command id* to obtain a d-axis current deviation Δid. The absolute value calculator 62 calculates an absolute value of the d-axis current deviation Δid. When the absolute value of the d-axis current deviation Δid is equal to or larger than a first d-axis threshold ΔUpd (which is an example of the first threshold), the comparer 63 outputs a d-axis carrier-up value Sud. When the absolute value of the d-axis current deviation Δid is equal to or smaller than a second d-axis threshold ΔDownd (which is an example of the second threshold), the comparer 64 outputs a d-axis carrier-down value Sdd.

The subtractor 65 subtracts the q-axis current iq from the q-axis current command iq* to obtain a q-axis current deviation Δiq. The absolute value calculator 66 calculates an absolute value of the q-axis current deviation Δiq. When the absolute value of the q-axis current deviation Δiq is equal to or larger than a first q-axis threshold ΔUpq (which is an example of the first threshold), the comparer 67 outputs a q-axis carrier-up value Suq. When the absolute value of the q-axis current deviation Δiq is equal to or smaller than a second q-axis threshold ΔDownq (which is an example of the second threshold), the comparer 68 outputs a q-axis carrier-down value Sdq.

The logical sum calculator 69 calculates a logical sum of a result of the comparison by the comparer 63 and a result of the comparison by the comparer 67. When at least one of the d-axis carrier-up value Sud and the q-axis carrier-up value Suq is input, the logical sum calculator 69 outputs a carrier-up value Su.

The multiplier 71 (which is an example of the first multiplier) multiplies the carrier-up value Su by a carrier-up gain Kup (which is an example of the first coefficient) and outputs the product as a carrier-up value Δup. The carrier-up value Δup is a control value (which is an example of the first control value) to increase the carrier frequency fc. For example, when Su=1 and Kup=−2, then Δup=−2.

The logical product calculator 70 calculates a logical product of a result of the comparison by the comparer 64 and a result of the comparison by the comparer 68. When both of the d-axis carrier-down value Sdd and the q-axis carrier-down value Sdq are input, the logical product calculator 70 outputs a carrier-down value Sd.

The multiplier 72 (which is an example of the second multiplier) multiplies the carrier-down value Sd by a carrier down gain Kdown (which is an example of the second coefficient) and outputs the product as a carrier-down value Δdown. The carrier-down value Δdown is a control value (which is an example of the second control value) to decrease the carrier frequency fc. For example, when Sd=1 and Kdown=1, then Δdown=1.

The adder 73 adds the product obtained by the multiplier 71 to the product obtained by the multiplier 72, and outputs the sum as a carrier change value to the integrator 52. When, for example, the absolute value of the d-axis current deviation Δid is equal to or larger than the first d-axis threshold ΔUpd or when the absolute value of the q-axis current deviation Δiq is equal to or larger than the first q-axis threshold ΔUpq, the outputter 51 outputs the carrier-up value Δup as a carrier change value.

When, for example, the absolute value of the d-axis current deviation Δid is equal to or smaller than the second d-axis threshold ΔDownd and when the absolute value of the q-axis current deviation Δiq is equal to or smaller than the second q-axis threshold ΔDownq, the outputter 51 outputs the carrier-down value Δdown as a carrier change value. When, for example, the absolute value of the d-axis current deviation Δid and the absolute value of the q-axis current deviation Δiq are not as described above, the outputter 51 does not output a carrier change value but outputs, for example, a value of "0".

The integrator 52 integrates the value output from the outputter 51 repeatedly in every command calculation cycle Ts. An integral value Tcnt, which is a result of the integration by the integrator 52, is input into the frequency determiner 53 through a limiter 54. The limiter 54 limits the integral value Tcnt within the range between the upper limit value Tmax and the lower limit value Tmin.

For example, when the integral value Tcnt exceeds the upper limit value Tmax, the limiter 54 outputs the upper limit value Tmax as the integral value Tcnt to replace the integral value Tcnt, which is obtained by the integrator 52, with the upper limit value Tmax. When the integral value Tcnt is smaller than the lower limit value Tmin, the limiter 54 outputs the lower limit value Tmin as the integral value Tcnt to replace the integral value Tcnt, which is obtained by the integrator 52, with the lower limit value Tmin.

Based on the integral value Tcnt, the frequency determiner 53 determines the carrier frequency fc. For example, the frequency determiner 53 performs the calculation represented by the following Formula (3), that is, divides the command calculation frequency fs by the integral value Tcnt, so as to determine the carrier frequency fc. That is, the command calculation frequency fs is Tcnt times the carrier frequency fc. Another possible embodiment is fs=fc×n (n is an integer of two or more).

$$fc = fs/Tcnt \qquad (3)$$

Assume that the command calculation frequency fs is 30 kHz, that the upper limit value Tmax is "10", that the lower limit value Tmin is "2", and that the frequency determiner 53 determines the carrier frequency fc by the calculation represented by Formula (3). In this case, the frequency determiner 53 sets the carrier frequency fc between 3 kHz and 15 kHz. For example, when the integral value Tcnt is "6", the frequency determiner 53 determines the carrier frequency fc as 5 kHz. When the integral value Tcnt is "2", the frequency determiner 53 determines the carrier frequency fc as 15 kHz.

The frequency changer 23 includes a carrier division number register 55, a carrier frequency register 56, and a register setter 57. The carrier division number register 55 stores the integral value Tcnt, which is output from the limiter 54, as a carrier counter division value Div. The carrier frequency register 56 stores the carrier frequency fc as a carrier frequency setting value Cfc.

Based on the carrier frequency setting value Cfc stored in the carrier frequency register 56, the register setter 57 calculates a carrier counter setting value Ctc (=1/Cfc) and sets the carrier counter setting value Ctc in a carrier counter register 78. At a timing corresponding to a valley of the carrier signal Sc, for example, the PWM controller 22 generates a carrier signal Sc of a carrier frequency fc that is based on the carrier counter setting value Ctc stored in the carrier counter register 78.

The register setter 57 also divides the carrier frequency setting value Cfc stored in the carrier frequency register 56 by the carrier counter division value Div stored in the carrier division number register 55 to obtain a calculation cycle setting value Ctu (=Cfc/Div). The register setter 57 stores the obtained calculation cycle setting value Ctu in a calculation cycle counter register 79.

Figure 5:
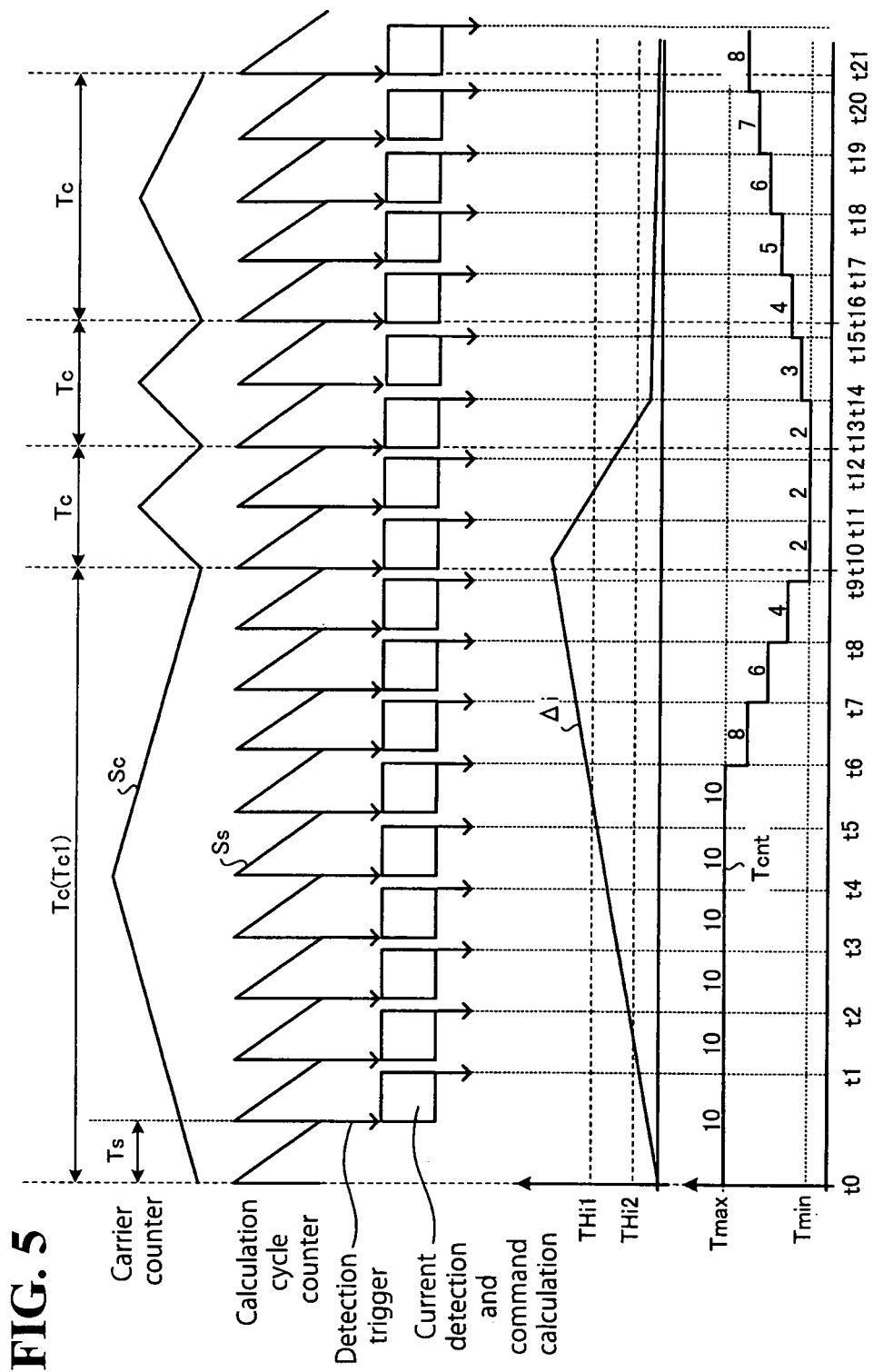
FIG. 5 is a graph of a carrier cycle counter, a calculation cycle counter, a command calculation cycle, a current deviation, and an integral value in relation to each other.

FIG. 5 is a graph of a carrier cycle counter, a calculation cycle counter, the command calculation cycle Ts (=1/fs), the current deviation Δi, and the integral value Tcnt in relation to each other. In the embodiment illustrated in FIG. 5, assume that Sudq=1, Sddq=1, Kup=−2, Kdown=1, fs=30 kHz, Tmax=10, and Tmin=2. Assume that at timing t0, Tcnt=Tmax, and at this time, fc=30 kHz/10=3 kHz. For ease of description, the current deviations Δid and Δiq will be referred to as the current deviation Δi. The following description will be under the assumption that when |Δid|≥|ΔUpd| and when |Δiq|≥|ΔUpq|, Δi≥THi1, and that when |Δid|≤|ΔDownd| and when |Δiq|≤|ΔDownq|, Δi≤THi2.

The PWM controller 22 includes a carrier counter and generates a carrier signal Sc of a carrier frequency fc (=3 kHz) that is based on the carrier counter setting value Ctc stored in the carrier counter register 78. The command generator 21 includes a calculation cycle counter. In a command calculation cycle Ts that is based on the calculation cycle setting value Ctu, the command generator 21 detects the d-axis current id and the q-axis current iq from the output currents iu, iv, and iw, and calculates output voltage commands vu*, vv*, and vw*. For example, at the timing at which a calculation cycle counter value Ss is zero, the command generator 21 starts detecting the d-axis current id and the q-axis current iq.

As illustrated in FIG. 5, the current deviation Δi gradually increases from timing t0. From timing t6 to timing t9 in the carrier cycle Tc1, the current deviation Δi is equal to or larger than the threshold THi1. In view of this, from timing t6 to timing t9, the outputter 51 repeatedly outputs the carrier-up value Δup (=−2). Thus, as illustrated in FIG. 5, the integral value Tcnt, which is obtained by the integrator 52, gradually decreases in the order: 10→8→6→4→2.

Based on the integral value Tcnt, the frequency determiner 53 determines the carrier frequency fc repeatedly in every command calculation cycle Ts. The frequency determiner 53 determines the carrier frequency fc in such a manner that as the integral value Tcnt decreases in the order: 10→8→6→4→2, the carrier frequency fc increases in the order: 3 kHz→3.75 kHz→5 kHz→7.5 kHz→15 kHz. The frequency determiner 53 sets, in the carrier frequency register 56, the carrier counter setting value Ctc in accordance with the determined carrier frequency fc. At timing t10, which is a timing corresponding to a valley of the carrier signal Sc, the PWM controller 22 changes the carrier signal Sc into a carrier signal of 15 kHz based on the carrier counter setting value Ctc to perform PWM control.

After the carrier signal Sc has been changed into the carrier signal of 15 kHz at timing t10, the current deviation Δi gradually decreases. Since the current deviation Δi is equal to or larger than the threshold THi2 from timing t11 to timing t12, the integral value Tcnt remains the lower limit value Tmin. Therefore, the frequency determiner 53 maintains the carrier frequency fc at 15 kHz at timing t13, which is a timing corresponding to a valley of the carrier signal Sc.

From timing t14 to timing t15, the current deviation Δi is equal to or smaller than the second threshold THi2. At timings t14 and t15, the outputter 51 repeatedly outputs the carrier-down value Δdown (=1). Therefore, as illustrated in FIG. 5, the integral value Tcnt, which is obtained by the integrator 52, gradually increases in the order: 2→3→4.

The frequency determiner 53 determines the carrier frequency fc in such a manner that as the integral value Tcnt increases in the order: 2→3→4, the carrier frequency fc decreases in the order: 15 kHz→7.5 kHz→5 kHz. The frequency determiner 53 sets the carrier counter setting value Ctc in accordance with the determined carrier frequency fc in the carrier frequency register 56. At timing t16, which is a timing corresponding to a valley of the carrier signal Sc, the PWM controller 22 changes the carrier signal Sc into a carrier signal of 5 kHz based on the carrier counter setting value Ctc to perform PWM control.

From then on, the frequency determiner 53 similarly determines the carrier frequency fc based on the integral value Tcnt to cause the current deviation Δi to decrease. Thus, as the current deviation Δi increases, the carrier cycle Tc of the PWM control is shortened. This configuration enhances control responsiveness. In addition, the integral value Tcnt is used to determine the carrier frequency fc. This ensures that even if noise or other factors cause a detection error or an estimation error, the carrier frequency fc is adjusted more accurately. Further, as the calculation cycle Ts becomes shorter with respect to the carrier cycle Tc, there is less of an influence of noise or other factors.

The carrier-up gain Kup and the carrier down gain Kdown are parameters settable by an input device not illustrated. Adjusting these parameters makes control responsiveness more accurate in accordance with the environment in which the power convertor 1 is installed. In the above-described embodiment, the carrier-up gain Kup is larger than the carrier down gain Kdown. This configuration increases the carrier frequency fc more expeditiously.

Referring back to FIG. 4, the gain setter 24 will be described. The gain setter 24 includes a delayer 82, a change detector 83, and a control gain setter 84. The delayer 82 delays and outputs the carrier counter setting value Ctc, which is set in the carrier counter register 78. When the carrier counter setting value Ctc set in the carrier counter register 78 is different from the carrier counter setting value Ctc output from the delayer 82, the change detector 83 determines that the carrier counter setting value Ctc has changed.

When the change detector 83 determines that the carrier counter setting value Ctc has changed, the control gain setter 84 selects a current control gain and a speed control gain in accordance with the carrier frequency fc determined by the frequency determiner 53. The control gain setter 84 sets the selected current control gain in the d-axis current controller 37 and the q-axis current controller 38, and sets the selected speed control gain in the speed controller 32. This configuration ensures that as the carrier frequency fc increases, the current control gain and the speed control gain increase.

The control gain setter 84 includes a control gain setting table that correlates, for example, the carrier frequency fc to the current control gain and the speed control gain. Based on the control gain setting table, the control gain setter 84 selects the current control gain and the speed control gain in accordance with the carrier frequency fc.

As described above, the controller 20 includes the gain setter 24. When the carrier frequency fc of the PWM controller 22 has been changed by the frequency changer 23, the gain setter 24 sets, in the command generator 21, a control gain in accordance with the carrier frequency fc. This configuration enhances control responsiveness appropriately in accordance with the carrier frequency fc.

Referring back to FIG. 2, the estimator 25 and the restrictor 26 will be described. The estimator 25 estimates a load that is applied on the power conversion unit 10, for example, per unit time. Based on the current output from the power conversion unit 10 and the carrier frequency fc, the estimator 25 estimates the load on the power conversion unit 10. A non-limiting example of the load on the power conversion unit 10 is power consumed by the switching elements constituting the power conversion unit 10. The estimator 25 may determine the current output from the power conversion unit 10 based on the output current detected by the current detector 11 or may determine the current output from the power conversion unit 10 based on the torque command T* or the q-axis current command iq*.

Based on the load on the power conversion unit 10, the restrictor 26 restricts the change made by the frequency changer 23 to the carrier frequency fc. As described above, the load on the power conversion unit 10 is determined by the estimator 25. Based on a result of the determination by the estimator 25, the restrictor 26 restricts the change made by the frequency changer 23 to the carrier frequency fc.

For example, when the sum of loads that are applied on the power conversion unit 10 in a predetermined period of time is equal to or larger than a first control value (which is an example of the predetermined value), the restrictor 26 stops the operation of the frequency changer 23. In this manner, the restrictor 26 restricts the change made by the frequency changer 23 to the carrier frequency fc. A non-limiting example of the control value is a value at which the power conversion unit 10 is kept from running out of order.

The restrictor 26 is also capable of limiting the change made by the frequency changer 23 to the carrier frequency fc within a range in accordance with the load on the power conversion unit 10. When the load applied on the power conversion unit 10 in a predetermined period of time is equal to or larger than a second control value, which is smaller than the first control value, the restrictor 26 may decrease the carrier frequency fc to equal to or lower than a predetermined value (for example, ½ of the upper limit value of the carrier frequency fc). This configuration minimizes the load applied on the power conversion unit 10.

Figure 6:
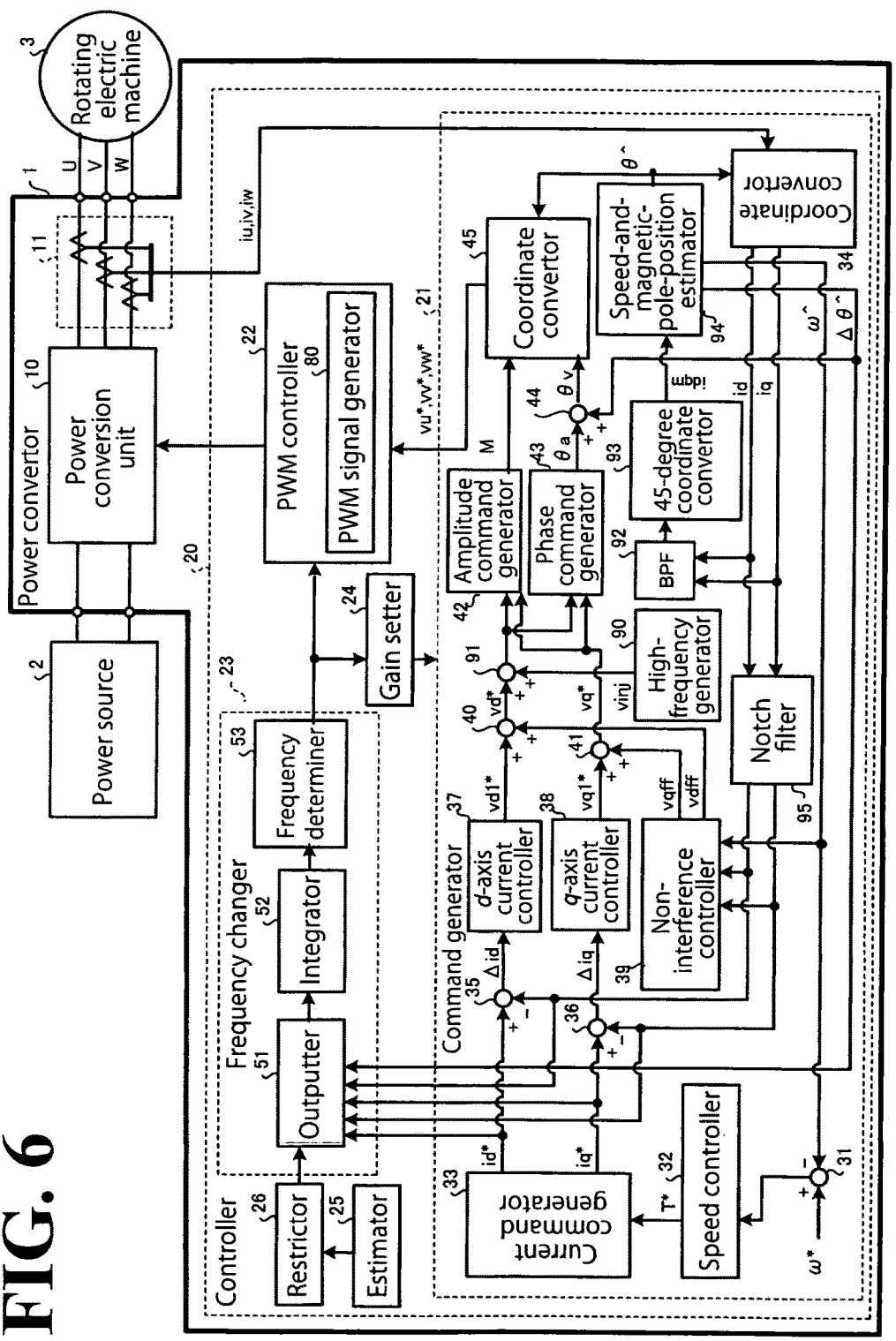
FIG. 6 is a diagram illustrating another exemplary configuration of the power convertor illustrated in FIG. 1A.

FIG. 6 is a diagram illustrating another exemplary configuration of the power convertor 1 illustrated in FIG. 1A. In the embodiment illustrated in FIG. 6, the control deviation Δcont is a control deviation of the output current and a control deviation of the rotation position. The power convertor 1 illustrated in FIG. 6 is an encoder-less power convertor. A non-limiting example of a rotating electric machine 3 illustrated in FIG. 6 is a rotating electric machine with magnetic saliency, such as an interior permanent magnet synchronous motor and a synchronous reactance motor.

The controller 20 of the power convertor 1 illustrated in FIG. 6 uses a difference (magnetic saliency) between inductance values of the magnetic flux axis (d-axis) and the axis (q-axis) perpendicular to the magnetic flux axis to estimate the magnetic pole position (electrical angle) of the rotor of the rotating electric machine 3. The controller 20 includes a high-frequency generator 90, an adder 91, a band pass filter (BPF) 92, a 45-degree coordinate convertor 93, a speed-and-magnetic-pole-position estimator 94, and a notch filter 95. In the following description, identical components of the controllers 20 illustrated in FIGS. 2 and 6 will be denoted with the same reference numerals and will not be elaborated here.

The high-frequency generator 90 generates and outputs a high-frequency voltage signal vinj of a frequency ωinj, which is higher than the frequency, ω, of the output voltage. The adder 91 adds the high-frequency voltage signal vinj, which is output from the high-frequency generator 90, to a d-axis voltage command vd* and outputs the sum. The d-axis voltage command vd* is a voltage command of a γ-axis (imaginary d-axis), which is a magnetic flux axis of the control. The high-frequency voltage signal vinj is superimposed on the d-axis voltage command vd* and thus a high-frequency current component flows through the rotating electric machine 3.

From the d-axis current id and the q-axis current iq, the band pass filter 92 extracts a component in the band of the frequency ωinj so as to extract the high-frequency current component flowing through the rotating electric machine 3. Then, the band pass filter 92 outputs the high-frequency current component as a d-axis current idbpf and as a q-axis current iqbpf. The 45-degree coordinate convertor 93 converts the d-axis current idbpf and the q-axis current iqbpf into currents in a dm-qm coordinate system, which is obtained by turning the d-q coordinate system by 45 degrees. Then, the 45-degree coordinate convertor 93 outputs the converted currents as a d-axis current idm and a q-axis current iqm.

The speed-and-magnetic-pole-position estimator 94 calculates, repeatedly in every command calculation cycle Ts, an estimation deviation of the rotation position (electrical angle) (hereinafter referred to as estimation position deviation Δθ^), an estimation value of the rotation speed w (hereinafter referred to as estimation speed ω^), and an estimation value of the rotation position (magnetic pole position) (hereinafter referred to as estimation position θ^).

The speed-and-magnetic-pole-position estimator 94 adjusts the estimation speed ω^ and the estimation position θ^ to make the amplitude of the d-axis current idm equal to the amplitude of the q-axis current iqm, thereby calculating the estimation speed ω^ and the estimation position θ^. For example, the speed-and-magnetic-pole-position estimator 94 calculates the amplitude of the d-axis current idm and the amplitude of the q-axis current iqm. Then, the speed-andmagnetic-pole-position estimator 94 performs proportional integration (PI) control of a deviation between the amplitude of the d-axis current idm and the amplitude of the q-axis current iqm using a PI controller, and calculates such an estimation speed $\hat{\omega}$ that makes the output of the PI controller zero. The speed-and-magnetic-pole-position estimator 94 also integrates the estimation speed $\hat{\omega}$ to obtain the estimation position $\hat{\theta}$.

Based on a difference ΔI between the amplitude, I1, of the d-axis current idm and the amplitude, I2, of the q-axis current iqm (ΔI=(I1−I2)/2), the speed-and-magnetic-pole-position estimator 94 obtains the estimation position deviation $\Delta\hat{\theta}$ by the calculation represented by the following Formula (4). In Formula (4), $L_d$ denotes a d-axis inductance value of the rotating electric machine 3, $L_q$ denotes a q-axis inductance value of the rotating electric machine 3, and vinj denotes the amplitude of the high-frequency voltage signal vinj.

$$\Delta\hat{\theta} = \sqrt{2} \times (\omega inj/Vinj) \times L_d \times L_q/(L_q - L_d) \times \Delta I \quad (4)$$

The speed-and-magnetic-pole-position estimator 94 may calculate the estimation position deviation $\Delta\hat{\theta}$, the estimation speed $\hat{\omega}$, and the estimation position $\hat{\theta}$ using an induction voltage observer, for example. In this case, there is no need for providing the high-frequency generator 90, the adder 91, the band pass filter 92, and the 45-degree coordinate convertor 93. It is possible to provide a speed deviation calculator to calculate a deviation between the speed command ω* and the estimation speed $\hat{\omega}$ as the estimation position deviation $\Delta\hat{\theta}$.

Figure 7:
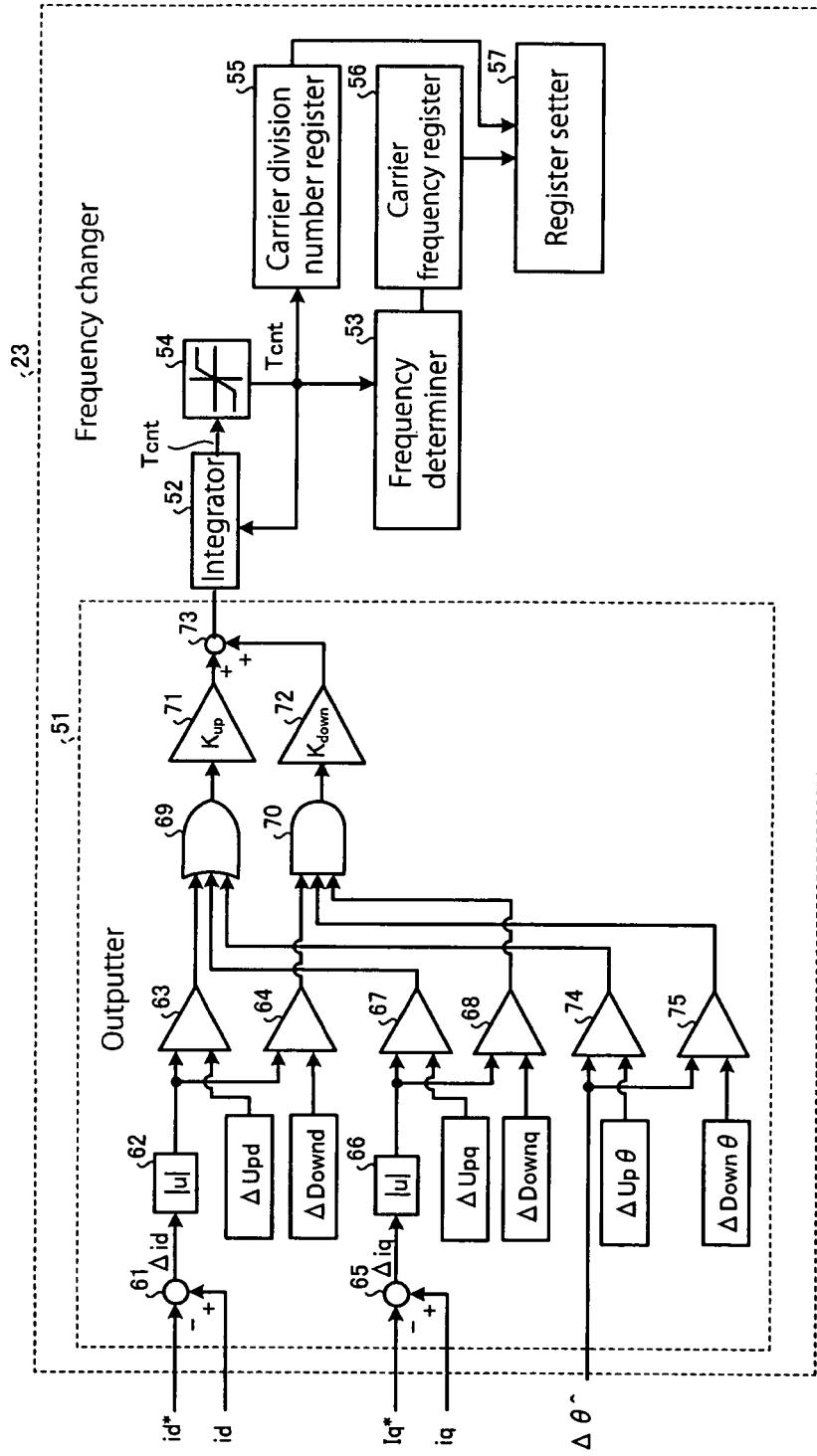
FIG. 7 is a diagram illustrating an exemplary configuration of the frequency changer illustrated in FIG. 6.

From the d-axis current id and the q-axis current iq converted by the coordinate convertor 34, the notch filter 95 removes a component in the band of the frequency ωinj, and outputs the resulting currents to the subtractors 35 and 36, and the outputter 51. The frequency changer 23 determines the carrier frequency fc based on the d-axis current command id*, the q-axis current command iq*, the d-axis current id, the q-axis current iq, and the estimation position deviation $\Delta\hat{\theta}$. FIG. 7 is a diagram illustrating an exemplary configuration of the frequency changer 23 illustrated in FIG. 6.

The frequency changer 23 illustrated in FIG. 7 is different from the frequency changer 23 illustrated in FIG. 4 in that the estimation position deviation $\Delta\hat{\theta}$ is taken into consideration as the control deviation in addition to the current deviation when the carrier frequency fc is changed. In the following description, identical components and functions of the frequency changers 23 illustrated in FIGS. 4 and 7 will be denoted with the same reference numerals and will not be elaborated here.

The frequency changer 23 illustrated in FIG. 7 includes a comparer 74 (which is an example of the first comparer) and a comparer 75 (which is an example of the second comparer). When the estimation position deviation $\Delta\hat{\theta}$ is equal to or larger than a first position threshold ΔUpθ, the comparer 74 outputs a carrier-up value Suθ. When the estimation position deviation $\Delta\hat{\theta}$ is equal to or smaller than a second position threshold ΔDownθ, the comparer 75 outputs a carrier-down value Sdθ.

The logical sum calculator 69 calculates a logical sum of the result of the comparison performed by the comparer 63, the result of the comparison performed by the comparer 67, and the result of the comparison by the comparer 74. When at least one of the d-axis carrier-up value Sud, the q-axis carrier-up value Suq, and the carrier-up value Suθ is input, the logical sum calculator 69 outputs the carrier-up value Su.

The multiplier 71 multiplies the carrier-up value Su by the carrier-up gain Kup and outputs the product as the carrier-up value Δup.

The logical product calculator 70 calculates a logical product of the result of the comparison performed by the comparer 64, the result of the comparison performed by the comparer 68, and the result of the comparison by the comparer 75. When all of the d-axis carrier-down value Sdd, the q-axis carrier-down value Sdq, and the carrier-up value Suθ are input, the logical product calculator 70 outputs the carrier-down value Sd. The multiplier 72 multiplies the carrier-down value Sd by the carrier down gain Kdown and outputs the product as the carrier-down value Δdown.

This configuration ensures changing the carrier frequency fc based on the current deviation Δi and the estimation position deviation $\Delta\hat{\theta}$. As the control deviation increases, the carrier cycle Tc is shortened, as described above. In addition, as the estimation position deviation $\Delta\hat{\theta}$ increases, the carrier cycle Tc is shortened. This configuration further enhances control responsiveness. Also in this configuration, the integral value Tcnt is used to determine the carrier frequency fc. This ensures that even if noise or other factors cause a detection error, the carrier frequency fc is adjusted more accurately.

In the embodiment illustrated in FIGS. 2 to 7, the current deviation Δi and the estimation position deviation $\Delta\hat{\theta}$ are taken as examples of the control deviation. Other possible examples of the control deviation include a control deviation of the output voltage and a control deviation of the rotation speed. In the case of the control deviation of the rotation speed, the frequency changer 23 may determine the carrier frequency fc based on, for example, a deviation (speed deviation) between the rotation speed ω and the speed command ω* illustrated in FIG. 2. Thus, based on at least one of the current deviation, the voltage deviation, the position deviation (phase deviation), and the speed deviation, the frequency changer 23 determines the carrier frequency fc.

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program, and thus functions as the command generator 21, the PWM controller 22, the frequency changer 23, the gain setter 24, the estimator 25, and the restrictor 26.

Alternatively, at least one or all of the command generator 21, the PWM controller 22, the frequency changer 23, the gain setter 24, the estimator 25, and the restrictor 26 may be made up of hardware such as an application specific integrated circuit (ASIC) and a field programmable gate array (FPGA).

Figure 8:
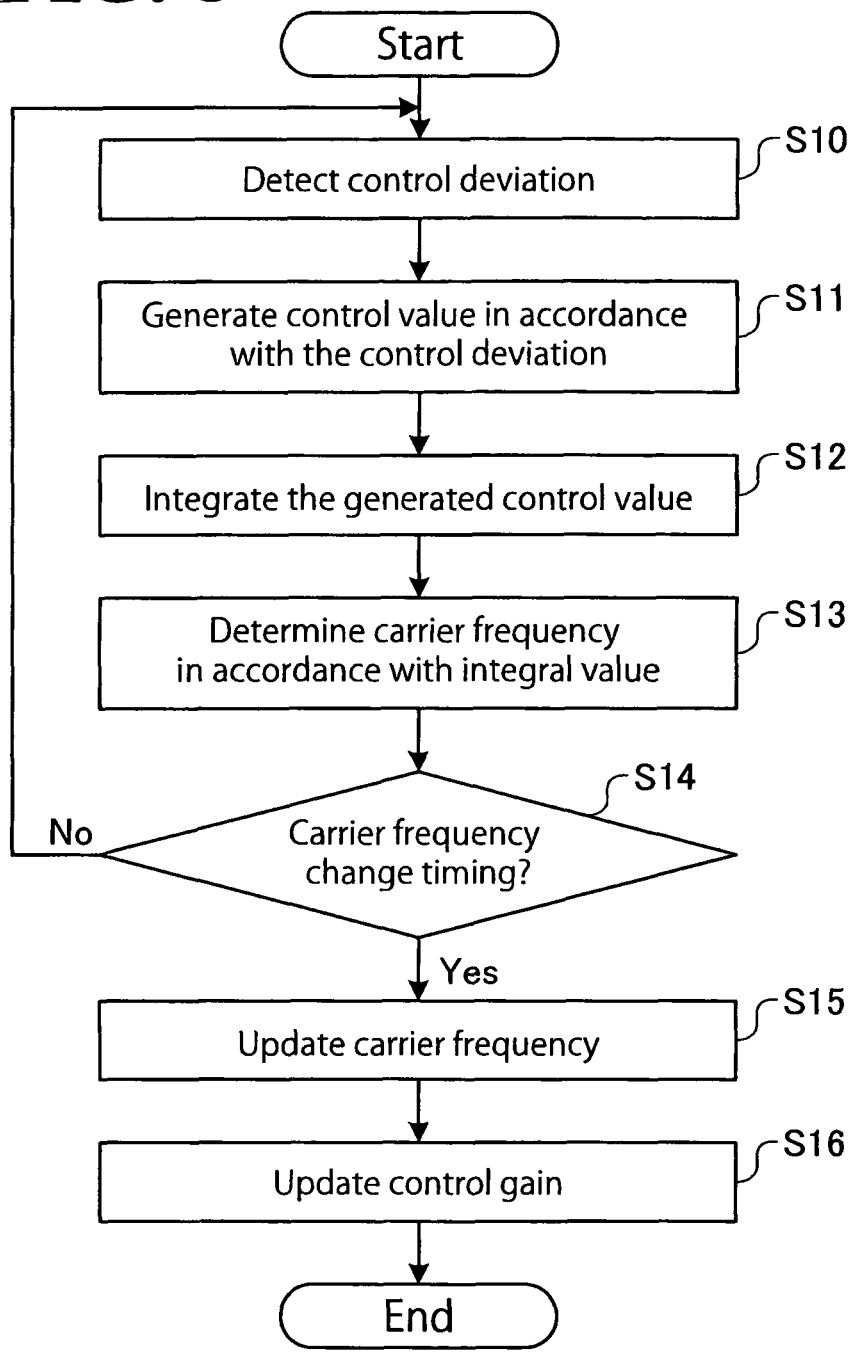
FIG. 8 is a flowchart of an exemplary flow of control processing performed by a controller.

FIG. 8 is a flowchart of an exemplary flow of control processing performed by the controller 20. The controller 20 repeatedly performs the control processing illustrated in FIG. 8. Steps S10 to S13 are processing performed by the frequency changer 23, steps S14 and S15 are processing performed by the PWM controller 22, and step S16 is processing by the gain setter 24.

As illustrated in FIG. 8, the outputter 51 of the frequency changer 23 detects the control deviation Δcont (step S10) and generates a control value in accordance with the control deviation Δcont (step S11). Examples of the control deviation Δcont include, but are not limited to, the current deviation, the position deviation (phase deviation), and the speed deviation. The control deviation may be based on a detection value or an estimation value.

The integrator 52 of the frequency changer 23 adds up control values output from the outputter 51 and thus integrates the output from the outputter 51 (step S12). The frequency determiner 53 of the frequency changer 23 determines the carrier frequency fc in accordance with the integral value Tcnt, which is obtained by the integrator 52, for example (step S13).

The PWM controller 22 makes a determination as to whether a timing for changing the carrier frequency fc has come (step S14). For example, at a timing corresponding to a valley of the carrier signal Sc, the PWM controller 22 determines that the timing is a timing for changing the carrier frequency fc.

When the timing is a timing for changing the carrier frequency fc (Yes at step S14), the PWM controller 22 updates the carrier frequency fc of the carrier signal Sc using the carrier frequency fc determined by the frequency determiner 53 at step S13 (step S15). It is noted that the processing at steps S14 and S15 is implemented by the PWM controller 22 functioning as a frequency changer. It is also possible for the frequency changer 23 to perform the processing at steps S14 and S15.

When the carrier frequency fc is updated, the gain setter 24 updates the control gain (step S16). In this processing, the gain setter 24 determines the current control gain and the speed control gain as control gains in accordance with the carrier frequency fc updated at step S15. The gain setter 24 sets the determined current control gain in the d-axis current controller 37 and the q-axis current controller 38, and sets the determined speed control gain in the speed controller 32.

When the timing is not a timing for changing the carrier frequency fc (No at step S14), the frequency changer 23 performs the processing at steps S10 to S13. The processing at steps S10 to S13 is repeatedly performed in every command calculation cycle Ts.

In the above-described embodiment, the carrier-up value Δup or the carrier-down value Δdown is generated in one command calculation cycle Ts. The carrier-up value Δup and the carrier-down value Δdown, however, may be generated at multiple stages. For example, when the control deviation Δcont is equal to or larger than the threshold TH1, the outputter 51 may increase the carrier-up value Δup to the positive side (or negative side) as the control deviation Δcont increases. When the control deviation Δcont is equal to or smaller than the threshold TH2, the outputter 51 may increase the carrier-up value Δup to the negative side (or positive side) as the control deviation Δcont decreases.

In the above-described embodiment, the command calculation frequency fs is Tcnt times the carrier frequency fc. This configuration, however, should not be construed in a limiting sense; it suffices that the command calculation frequency fs is higher than the carrier frequency fc. Thus, even if noise or other factors cause a detection error, the carrier frequency fc is adjusted more accurately.

In the above-described embodiment, the output voltage is a three-phase AC voltage. This configuration, however, should not be construed in a limiting sense. Another possible embodiment is that the output voltage is a single-phase AC voltage.

In the above-described embodiment, the carrier frequency fc of the PWM controller 22 is changed at a timing corresponding to a valley of the carrier signal Sc. Another possible embodiment is that the PWM controller 22 and the frequency changer 23 change the carrier frequency fc of the PWM controller 22 at a timing corresponding to a peak of the carrier signal Sc. Another possible embodiment is that the PWM controller 22 and the frequency changer 23 change the carrier frequency fc of the PWM controller 22 at timings corresponding to a peak and a valley of the carrier signal Sc. Another possible embodiment is that the PWM controller 22 and the frequency changer 23 regard peaks and valleys of the carrier signal Sc as count timings, and change the carrier frequency fc of the PWM controller 22 at every m-th counting (m is an integer of three or more).

In the above-described embodiment, the d-axis current deviation Δid and the q-axis current deviation Δiq are respectively compared with the first threshold and the second threshold. This configuration, however, should not be construed as limiting comparison subjects. Another possible embodiment is that the outputter 51 calculates root mean squares of the d-axis current deviation Δid and the q-axis current deviation Δiq, and compares the root mean squares respectively with the first threshold and the second threshold. Another possible embodiment is to compare the q-axis current deviation Δiq with the first threshold and the second threshold.

In the above-described embodiment, the carrier-up value Δup is a negative value, and the carrier-down value Δdown is a positive value. Another possible example is that the carrier-up value Δup is a positive value, and the carrier-down value Δdown is a negative value. In this case, the frequency determiner 53 determines the carrier frequency fc by the calculation represented by equation fc=fs/−Tcnt, for example. In this case, the upper limit value Tmax and the lower limit value Tmin are negative values where Tmax<Tmin.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A power convertor comprising:
   a power conversion unit comprising a plurality of switching elements;
   a PWM controller configured to perform PWM control of the plurality of switching elements; and
   a frequency changer configured to change a carrier frequency in the PWM control, the frequency changer comprising:
      an outputter configured to output a control value in accordance with a control deviation with respect to a control target;
      an integrator configured to integrate the control value output from the outputter; and
      a frequency determiner configured to determine the carrier frequency based on an integral value obtained by the integrator,
   wherein when the control deviation with respect to the control target is equal to or larger than a first threshold, the outputter is configured to output a first control value to increase the carrier frequency, and
   wherein when the control deviation is equal to or smaller than a second threshold, the outputter is configured to output a second control value to decrease the carrier frequency.

2. The power convertor according to claim 1, wherein the outputter comprises
   a difference calculator configured to calculate the control deviation,
   a first comparer configured to compare the control deviation with the first threshold, a second comparer configured to compare the control deviation with the second threshold, a first multiplier configured to multiply an output of the first comparer by a first coefficient, a second multiplier configured to multiply an output of the second comparer by a second coefficient, and an adder configured to add an output of the first multiplier to an output of the second multiplier.

3. The power convertor according to claim 1, further comprising a command generator configured to calculate a control command based on the control deviation, wherein the PWM controller comprises a PWM signal generator configured to generate a PWM signal based on the control command.

4. The power convertor according to claim 3, wherein the command generator comprises a calculation frequency higher than the carrier frequency, and wherein the outputter is configured to output the control value in accordance with the control deviation in every calculation cycle of the command generator.

5. The power convertor according to claim 4, wherein the calculation frequency is n times the carrier frequency, n being an integer of two or more, and wherein the frequency determiner is configured to divide the calculation frequency by the integral value obtained by the integrator so as to obtain a frequency, and configured to determine the obtained frequency as the carrier frequency.

6. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:

an outputter configured to output a control value in accordance with a control deviation with respect to a control target;

an integrator configured to integrate the control value output from the outputter; and a frequency determiner configured to determine the carrier frequency based on an integral value obtained by the integrator; and a command generator configured to calculate a control command based on the control deviation, wherein the PWM controller comprises a PWM signal generator configured to generate a PWM signal based on the control command, wherein the command generator comprises a calculation frequency higher than the carrier frequency, and wherein the outputter is configured to output the control value in accordance with the control deviation in every calculation cycle of the command generator.

7. The power convertor according to claim 6, wherein the calculation frequency is n times the carrier frequency, n being an integer of two or more, and wherein the frequency determiner is configured to divide the calculation frequency by the integral value obtained by the integrator so as to obtain a frequency, and configured to determine the obtained frequency as the carrier frequency.

8. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:

an outputter configured to output a control value in accordance with a control deviation with respect to a control target;

an integrator configured to integrate the control value output from the outputter; and a frequency determiner configured to determine the carrier frequency based on an integral value obtained by the integrator;

a command generator configured to calculate a control command based on the control deviation; and a gain setter configured to, when the carrier frequency in the PWM control is changed, set a control gain in accordance with the changed carrier frequency in the command generator, wherein the PWM controller comprises a PWM signal generator configured to generate a PWM signal based on the control command.

9. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:

an outputter configured to output a control value in accordance with a control deviation with respect to a control target;

an integrator configured to integrate the control value output from the outputter; and a frequency determiner configured to determine the carrier frequency based on an integral value obtained by the integrator; and a command generator configured to calculate a control command based on the control deviation, wherein the PWM controller comprises a PWM signal generator configured to generate a PWM signal based on the control command, wherein the control target comprises a rotation position of a rotating electric machine controlled by power output from the power conversion unit, and wherein the control deviation comprises another control deviation of the rotation position.

10. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:

an outputter configured to output a control value in accordance with a control deviation with respect to a control target;

an integrator configured to integrate the control value output from the outputter; and a frequency determiner configured to determine the carrier frequency based on an integral value obtained by the integrator; and a command generator configured to calculate a control command based on the control deviation, wherein the PWM controller comprises a PWM signal generator configured to generate a PWM signal based on the control command, wherein the control target comprises a rotation speed of the rotating electric machine controlled by the power output from the power conversion unit, and wherein the control deviation comprises another control deviation of the rotation speed.

11. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:
    an outputter configured to output a control value in accordance with a control deviation with respect to a control target;
    an integrator configured to integrate the control value output from the outputter; and
    a frequency determiner configured to determine the carrier frequency based on an integral value obtained by the integrator; and a limiter configured to output an upper limit value when the integral value obtained by the integrator is higher than the upper limit value, and configured to output a lower limit value when the integral value obtained by the integrator is lower than the lower limit value, wherein the frequency changer is configured to change the carrier frequency based on at least one value among the upper limit value and the lower limit value output from the limiter.

12. A power convertor comprising:

a power conversion unit comprising a plurality of switching elements;

a PWM controller configured to perform PWM control of the plurality of switching elements;

a frequency changer configured to change a carrier frequency in the PWM control, the frequency changer comprising:
    an outputter configured to output a control value in accordance with a control deviation with respect to a control target;
    an integrator configured to integrate the control value output from the outputter; and
    a frequency determiner configured to determine the carrier frequency based on an integral value obtained by the integrator; and a restrictor configured to restrict a change in the carrier frequency by the frequency changer based on a load on the power conversion unit.

13. The power convertor according to claim 12, wherein the restrictor is configured to restrict the change made by the frequency changer to the carrier frequency when a sum of loads on the power conversion unit in a predetermined period of time exceeds a predetermined value.

14. The power convertor according to claim 12, further comprising an estimator configured to estimate the load on the power conversion unit based on the current output from the power conversion unit and the carrier frequency, wherein the restrictor is configured to restrict the change made by the frequency changer to the carrier frequency based on the load estimated by the estimator.

15. A controller to change a carrier frequency in PWM control comprising:

an outputter configured to output a control value in accordance with a control deviation with respect to a control target;

an integrator configured to integrate the control value output from the outputter; and a frequency determiner configured to determine the carrier frequency based on an integral value obtained by the integrator, wherein when the control deviation with respect to the control target is equal to or larger than a first threshold, the outputter is configured to output a first control value to increase the carrier frequency, and wherein when the control deviation is equal to or smaller than a second threshold, the outputter is configured to output a second control value to decrease the carrier frequency.

16. A method for changing a carrier frequency in PWM control comprising:

generating a control value in accordance with a control deviation with respect to a control target;

integrating the generated control value;

determining the carrier frequency based on an integral value obtained in the integrating step;

outputting a first control value to increase the carrier frequency when the control deviation with respect to the control target is equal to or larger than a first threshold; and outputting a second control value to decrease the carrier frequency when the control deviation is equal to or smaller than a second threshold.

17. A power convertor comprising:

a power conversion unit comprising a plurality of switching elements;

means for performing PWM control of the plurality of switching elements; and means for changing a carrier frequency in the PWM control, the frequency changing means comprising:
    means for outputting a control value in accordance with a control deviation with respect to a control target;
    means for integrating the control value output from the outputting means; and
    means for determining the carrier frequency based on an integral value obtained by the integrating means, wherein when the control deviation with respect to the control target is equal to or larger than a first threshold, the means for outputting outputs a first control value to increase the carrier frequency, and wherein when the control deviation is equal to or smaller than a second threshold, the means for outputting outputs a second control value to decrease the carrier frequency.

* * * * *